United States Patent
Wright et al.

(10) Patent No.: US 11,473,700 B2
(45) Date of Patent: Oct. 18, 2022

(54) STRUT PIPE CLAMP INCLUDING WORM GEAR FOR ACCOMMODATING VARIOUS PIPE SIZES

(71) Applicant: ZSI-Foster, Inc., Canton, MI (US)

(72) Inventors: Thomas D. Wright, Belleville, MI (US); Joshua Blake Smith, Manchester, TN (US)

(73) Assignee: ZSI-Foster, Inc., Canton, MI (US)

( * ) Notice: Subject to any disclaimer, the term of this patent is extended or adjusted under 35 U.S.C. 154(b) by 0 days.

(21) Appl. No.: 17/195,802

(22) Filed: Mar. 9, 2021

(65) Prior Publication Data
US 2022/0290782 A1    Sep. 15, 2022

(51) Int. Cl.
*F16L 3/24* (2006.01)
*F16L 3/04* (2006.01)

(52) U.S. Cl.
CPC .............. *F16L 3/2431* (2019.08); *F16L 3/04* (2013.01)

(58) Field of Classification Search
CPC . F16L 3/2431; F16L 3/04; F16L 3/243; F16L 3/105; F16L 3/227; F16B 2/04; F16B 37/045; F16B 2/065; H02G 3/32; E04B 1/4107
See application file for complete search history.

(56) References Cited

U.S. PATENT DOCUMENTS

| | | | | |
|---|---|---|---|---|
| 3,226,069 A | * | 12/1965 | Clarke | F16L 3/2431 24/282 |
| 3,463,428 A | * | 8/1969 | Kindorf | F16L 3/227 248/74.5 |
| 3,527,432 A | * | 9/1970 | Lytle | F16L 3/10 248/62 |

(Continued)

FOREIGN PATENT DOCUMENTS

| | | | | |
|---|---|---|---|---|
| DE | 202014000265 U1 | * | 4/2015 | ............ F16L 55/035 |
| EP | 2587105 A1 | * | 5/2013 | ............ F16L 3/243 |

(Continued)

OTHER PUBLICATIONS

Universal 2-Piece EMT Conduit Strut clamp on youtube.com dated Oct. 23, 2017. https://www.youtube.com/watch?v=-xoC4orlDVk (Year: 2017).*

(Continued)

*Primary Examiner* — Terrell L Mckinnon
*Assistant Examiner* — Ding Y Tan
(74) *Attorney, Agent, or Firm* — Harness, Dickey & Pierce, P.L.C.

(57) ABSTRACT

A clamp includes first and second bands, a pair of strut attachment legs, a screw, and a screw housing. Each band has a first end and a second end. The first band defines slots extending across a width thereof and disposed adjacent to the second end thereof. Each strut attachment leg is fixed to the first end of one of the bands. The screw housing receives (Continued)

the second ends of the bands and captures the screw while allowing the screw to rotate. The clamp secures a tube to a strut when the clamp is placed over the tube, the strut attachment legs are positioned relative to the strut so that notches in the strut attachment legs receive at least one of the flanges on the strut, and the screw is rotated to draw the first band further into the screw housing and thereby tighten the clamp around the tube.

19 Claims, 7 Drawing Sheets

(56) References Cited

U.S. PATENT DOCUMENTS

| | | | | |
|---|---|---|---|---|
| 3,650,499 | A * | 3/1972 | Biggane | F16L 3/2431 248/62 |
| 3,950,830 | A * | 4/1976 | Duprez | F16L 33/08 24/274 R |
| 4,044,428 | A * | 8/1977 | Kowalski | F16L 3/243 24/16 R |
| 4,286,361 | A * | 9/1981 | MacKenzie | F16L 33/08 24/20 LS |
| 4,429,440 | A * | 2/1984 | Laughlin | F16L 3/2431 248/62 |
| 4,961,553 | A | 10/1990 | Todd | |
| 5,022,614 | A * | 6/1991 | Rinderer | F16L 3/105 248/62 |
| 7,073,755 | B2 * | 7/2006 | Michaud | F16B 2/065 248/74.1 |
| 8,322,661 | B2 * | 12/2012 | Oh | F16L 3/10 248/62 |
| 9,347,589 | B1 * | 5/2016 | Oh | F16L 3/22 |
| 10,697,563 | B2 | 6/2020 | Wegner | |
| 11,009,153 | B1 * | 5/2021 | Hikoyama | F16L 3/1008 |
| 2005/0163561 | A1 | 7/2005 | Weger et al. | |
| 2006/0284027 | A1 * | 12/2006 | Smith | F16L 3/04 248/65 |
| 2009/0272856 | A1 * | 11/2009 | Azuma | F16L 3/04 248/49 |
| 2012/0012715 | A1 * | 1/2012 | Andersen | H02G 3/32 248/74.1 |

FOREIGN PATENT DOCUMENTS

| | | | | |
|---|---|---|---|---|
| JP | 07127765 | A * | 5/1995 | F16L 3/24 |
| JP | 2012112457 | A | 6/2012 | |
| KR | 1020140058316 | A | 5/2014 | |
| NL | 8300252 | A * | 9/1983 | F16L 33/04 |

OTHER PUBLICATIONS

Superstrut cobra onepiece cable and pipe clamp sold by thomas & betts product literature (Year: 2004).*
Unistrut MU025 thru MU400 Mustang Universal One-Piece Pipe Conduit Clamp (Year: 2020).*
International Search Report and Written Opinion for Application No. PCT/US2022/019327 dated Jun. 16, 2022.

* cited by examiner

STRUT PIPE CLAMP INCLUDING WORM GEAR FOR ACCOMMODATING VARIOUS PIPE SIZES

FIELD

The present disclosure relates to strut pipe clamps including a worm gear for accommodating various pipe sizes.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various clamps are used in electrical and mechanical applications to secure a conduit, pipe, or tube to a strut for anchoring and support purposes. Building and electrical codes govern spacing requirements for pipe and conduit support. The struts of a conduit or pipe support system may be wall-mounted and oriented either in a horizontal or vertical attitude. The struts may also be fastened directly to steel trusses or hung therefrom using beam clamps and various lengths of threaded rod. In the examples described herein, the clamps secure the conduit, pipe, or tube above and/or below the strut, which forms a "trapeze" support system. Electrical, mechanical, and refrigeration systems frequently route groups of conduit, pipe, or tube together, where the same strut member may support multiple conduits, pipes, or tubes.

Figure 1:
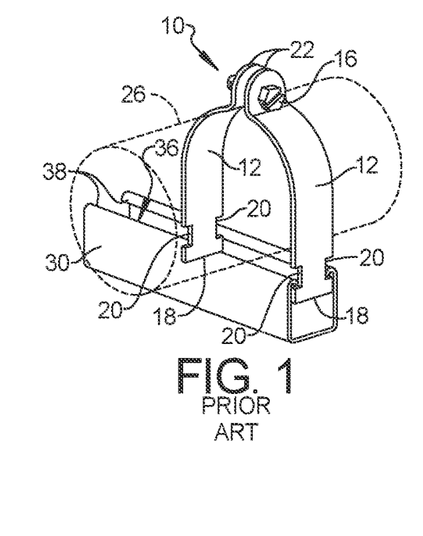
FIG. 1 is a perspective view of a four-piece clamp according to the prior art securing a conduit, tube, or pipe to a strut.
Figure 2:
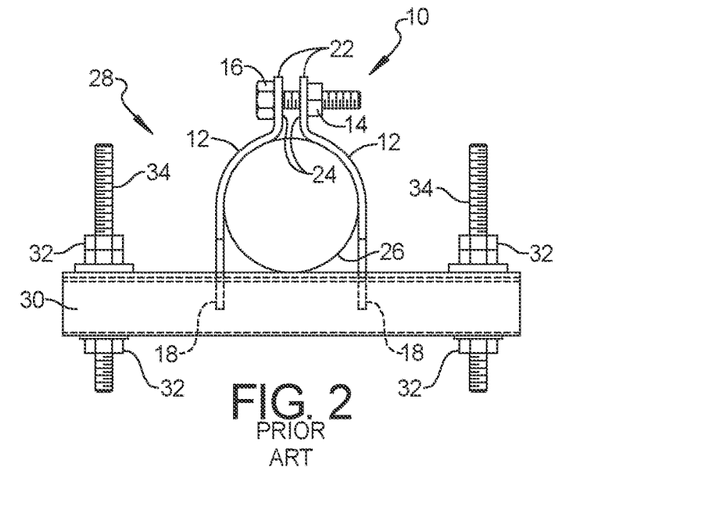
FIG. 2 is an end view of the four-piece clamp of FIG. 1 securing the pipe to the strut, with threaded rods and nuts suspending the strut to form a trapeze.

Referring now to FIGS. 1 and 2, a four-piece clamp 10 according to the prior art includes a pair of curved clamp halves 12, a nut 14, and a bolt 16. Each clamp half 12 has a square end 18 with notches 20 adjacent thereto and a rounded end 22 with a hole 24 adjacent thereto. The process for installing the four-piece clamp 10 varies with the directional attitude of a conduit, pipe, or tube 26 to be supported.

In one example, a hanger 28 is constructed with a horizontal strut 30, nuts 32, and threaded rods 34, and the tube 26 is placed above the strut 30 of the hanger 28. The tradesmen connects the tube 26 to its predecessor tube in the distribution system, and then secures the tube 26 to the hanger 28 with the clamp 10. Each clamp half 12 is inserted into a continuous slot 36 in the face of the strut 30 and then rotated 90 degrees to engage in-turned flanges 38 of the strut 30. The clamp halves 12 are formed to the radial profile of the tube 26 to be clamped. One clamp half 12 is installed on each side of the tube 26, and then the nut 14 and the bolt 16 are used to connect the clamp halves 12 loosely around the tube 26. The tradesmen slide the clamp 10 along the strut 30 from side to side (e.g., in the left-right direction as shown in FIG. 2) as required to properly orient the tube 26 to ensure a straight run (e.g., to ensure that the tube 26 and other tubes joined thereto are aligned in a straight line). When the tube 26 is properly placed, the nut 14 and bolt 16 are tightened, which secures the tube 26 to the strut 30.

Tradesmen frequently install clamps such as the clamp 10 while on ladders or other high reach equipment and therefore prefer that the clamps have as few parts as possible to make easier to secure the clamps to the strut. While the clamp 10 is the most popular clamp design, there have been many attempts to make a new clamp design that eliminates components and thereby improves the ease of the installation process.

Figure 3:
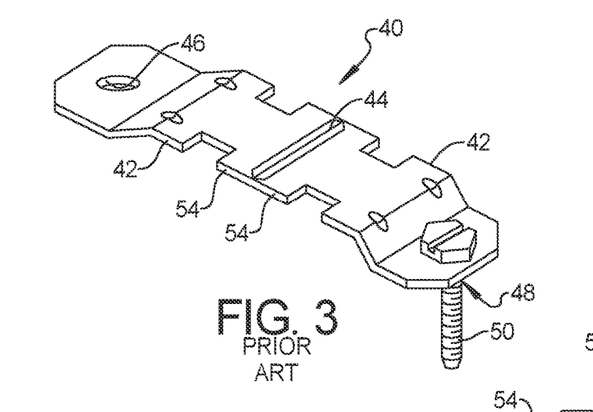
FIGS. 3 and 4 are perspective views of breakaway clamps according to the prior art.

Referring now to FIG. 3, one attempt to reduce part count is embodied in a breakaway clamp 40. In this design, clamp halves 42 are produced as one unit, with the clamp halves 42 being die scored (i.e., having a score line 44 therebetween) but still joined together. In this design, one of the clamp halves 42 is provided with a threaded hole 46, which is formed while the clamp 40 is produced. The other clamp half 42 has a hole 48 and a contained screw 50 (i.e., the screw 50 is held within the hole 48). To install the breakaway clamp 40, the tradesmen break the clamp halves 42 apart along the score line 44 and then install the clamp 40 using an installation process similar to the one described above with respect to the four-piece clamp 10 of FIGS. 1 and 2.

Figure 4:
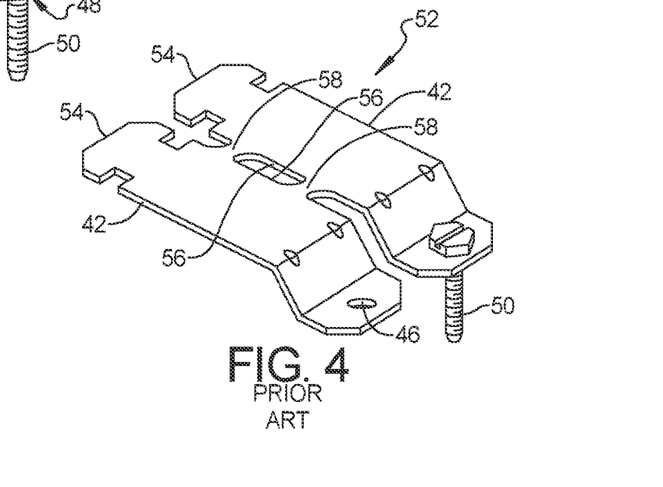

Referring now to FIG. 4, a breakaway clamp 52 is similar to the breakaway clamp 40. However, in the breakaway clamp 40, ends 54 of the clamp halves 42 opposite the holes 46, 48 are joined together with the score line 44 being disposed therebetween. In contrast, in the breakaway clamp 52, sides 56 of the clamp halves 42 are joined together by sections 58 having reduced cross-sectional areas relative to the rest of the clamp halves 42. To separate the clamp halves 42 of the breakaway clamp 52 from one another, the tradesmen break the sections 58.

The designs of the breakaway clamps 40, 52 have several downfalls. Because the tradesmen may drop components as they work, clamps that have left and right components are not desirable. In addition, only one thread is typically provided in the threaded hole 26 and, as the clamps 40, 52 are produced from low carbon steel, the thread tends to strip. Further, the alignment of the clamp halves 42 is critical when utilizing a stamped thread process, as the clamps 40, 52 are assembled to a recommended torque value to ensure clamp performance. Thus, should the clamp alignment not be precise, the torque values may not properly translate into bolt tension, which may negatively impact the clamps performance. Moreover, the clamp halves 42 typically have a sharp edge, and may produce a dangerous burr, at the locations where the clamp halves 42 are separated from each other. Also, the separation of the clamp halves 42 is accomplished by the tradesman bending the clamp halves 42 back and forth until the clamp halves 42 break apart, which adds labor cost to the process.

Figure 5:
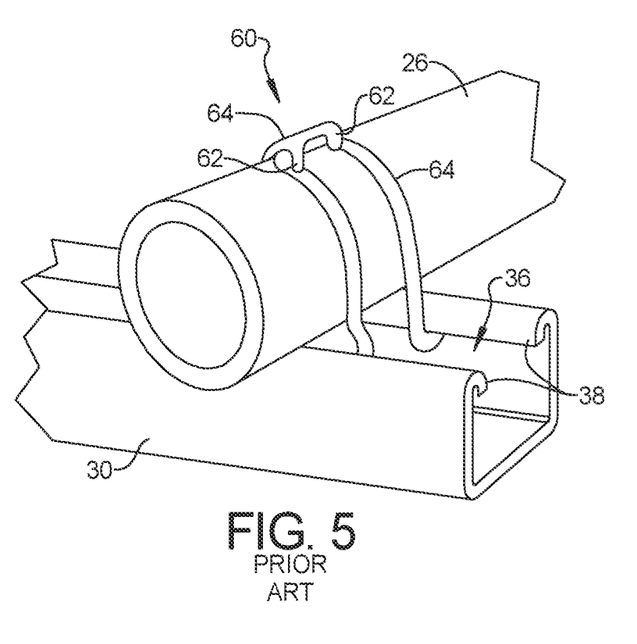
FIG. 5 is a perspective view of a twist ear clamp according to the prior art.

Referring now to FIG. 5, another attempt to reduce piece count is embodied in a twist ear clamp 60. This style of clamp eliminates the fastener components by providing wire tabs 62 that project from above each clamp half 64. The tradesmen align the clamp halves 64 in the conventional manner and, using locking grip pliers or other hand tool, squeeze the tabs 62 of the clamp halves 64 together and twist them to secure the halves 64 together.

This clamp design leaves an unconventional looking assembly that has had minimal acceptance in the market. Relocation of the clamp 60 for conduit, pipe, or tubing alignment is difficult, and the twisted tabs 62 that extend above the clamped assembly are unsightly. In addition, the clamp 60 cannot be reused as the tabs 62 may break off if untwisted.

Figure 6:
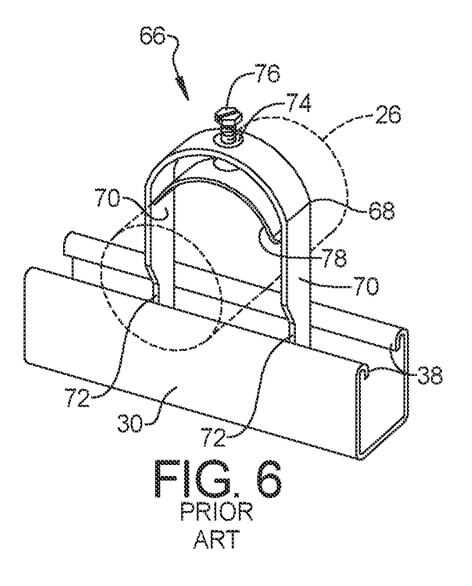
FIGS. 6 and 7 are perspective views of one-piece clamps according to the prior art.

Referring now to FIG. 6, yet another attempt to reduce piece count is embodied in a one-piece clamp 66. The one-piece clamp 66 is constructed to engage only one side of the strut 30 (i.e., only one of the in-turned flanges 38). The clamp 66 includes a stamped frame 68 that is larger than the tube 26 to be clamped, and the clamp 66 has legs 70 provided with notches 72 that engage one of the in-turned flanges 38 of the strut 30. The frame 68 defines a threaded hole 74 at the top of the frame 68, and a dog-point screw 76 is inserted into the threaded hole 74. A curved plate 78 is attached to the end of the dog-point screw 76. The curved plate 78 is formed to the radius of the tube 26 to be clamped. The screw 76 is peened on the end securing the curved plate 78. However, the screw 76 can still rotate while the curved plate 78 is contained from rotation. As the screw 76 is tightened, the curved plate 78 lowers until it contacts the tube 26 to be clamped.

Figure 7:
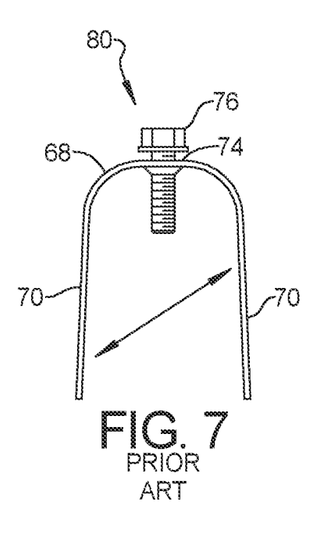
Figure 8:
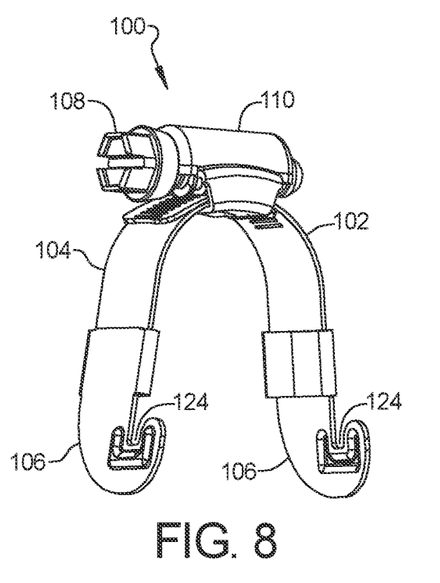
FIGS. 8 through 11 are perspective views of a worm gear strut clamp according to the present disclosure.
Figure 9:
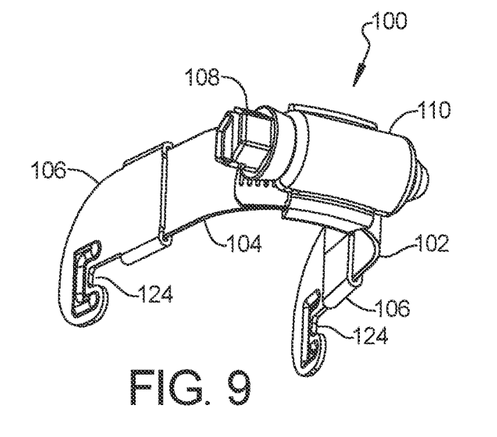
Figure 10:
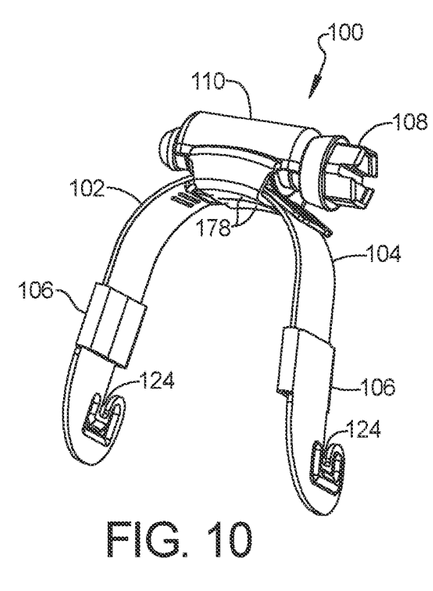
Figure 11:
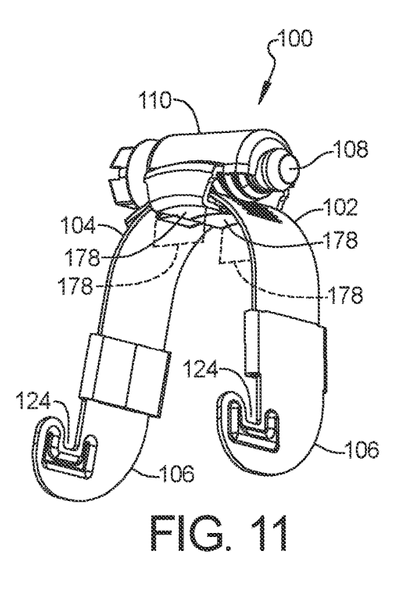

Referring now to FIG. 7, a one-piece clamp 80 is similar to the one-piece clamp 66. However, the one-piece clamp 80 does not include the curved plate 78. Instead, the one-piece clamp 80 utilizes the screw 76 to contact the tube 26 directly which, in some cases, could cause damage. The clamp 80 is expensive in comparison to the conventional clamps and has a limited usage in the market because of its high cost.

SUMMARY

This application discloses a clamp for securing a tube to a strut. The strut includes a bottom wall and a pair of sidewalls projecting from the bottom wall to define a rectangular channel therebetween. The sidewalls forming flanges that are turned inward to define an opening therebetween that provides access to the rectangular channel. In one example, the clamp includes first and second bands, a pair of strut attachment legs, a screw having threads, and a screw housing. Each band has a first end and a second end opposite of the first end. The first band defines slots therein extending across a width thereof and disposed adjacent to the second end thereof. Each strut attachment leg is fixed to the first end of one of the bands and each strut attachment leg defines a notch configured to receive one of the flanges on the strut. The screw housing receives the second ends of the bands and captures the screw while allowing the screw to rotate. The screw housing positions the screw so that the threads on the screw engage the slots in the first band. The clamp is configured to secure the tube to the strut when the clamp is placed over the tube, the strut attachment legs are positioned relative to the strut so that the notches in the strut attachment legs receive at least one of the flanges on the strut. The screw is rotated to draw the first band further into the screw housing and thereby tighten the clamp around the tube.

In one aspect, each strut attachment leg has a hooked end that defines the notch.

In one aspect, the hooked end of each strut attachment leg includes a first portion that extends in a first direction, a second portion that extends in a second direction perpendicular to the first direction, and a third portion that extends in a third direction perpendicular to the second direction and parallel to the first direction. The first, second, and third portions have side edges that define the notch.

In one aspect, the third portion of each hooked end is configured to be disposed between one of the flanges on the strut and the respective sidewall of the strut when the notch in the respective hooked end receives the respective flange.

In one aspect, the hooked end of each strut attachment leg has a J-shaped profile.

In one aspect, the notch in the hooked end of one of the strut attachment legs receives one of the flanges on the strut, and the notch in the hooked end of the other one of the strut attachment legs receives the other one of the flanges on the strut.

In one aspect, the notch in the hooked end of one of the strut attachment legs receives one of the flanges on the strut, and the notch in the hooked end of the other one of the strut attachment legs receives the same flange on the strut.

In another example, the clamp includes at least one band, a pair of strut attachment legs, a screw having threads, and a screw housing. The at least one band defines slots extending across a width thereof and disposed at various locations along a length thereof. Each strut attachment leg is fixed to an end of the at least one band and each strut attachment leg defines a notch configured to receive one of the flanges on the strut. The screw housing is coupled to the at least one band and positioned approximately equidistant from the strut attachment legs. The screw housing captures the screw while allowing the screw to rotate. The screw housing positions the screw so that the threads on the screw engage the slots in the at least one band. The clamp is configured to secure the tube to the strut when the clamp is placed over the tube, the strut attachment legs are positioned relative to the strut so that the notches in the strut attachment legs receive at least one of the flanges on the strut, and the screw is rotated to draw the at least one band into the screw housing and thereby tighten the clamp around the tube.

In one aspect, the at least one band includes first and second bands that each have a first end and a second end opposite of the first end, the slots extending across the width of the first band and disposed adjacent to the second end of the first band. Each strut attachment leg is fixed to the first end of one of the bands. The screw housing receives and retains the second ends of the bands.

In one aspect, the first band has a first length and the second band has a second length that is approximately equal to the first length.

In one aspect, when the clamp secures the tube to the strut, the screw and the screw housing are diametrically opposed from a contact interface between the tube and the strut.

In one aspect, the notch in one of the strut attachment legs receives one of the flanges on the strut, and the notch in the other one of the strut attachment legs receives the other one of the flanges on the strut.

In one aspect, the notch in the one of the strut attachment legs receives one of the flanges on the strut, and the notch in the other one of the strut attachment legs receives the same flange on the strut.

In another example, the clamp includes at least one band, a pair of strut attachment legs, a screw having threads, and a screw housing. The at least one band defines slots extending across a width thereof and disposed at various locations along a length thereof. The strut attachment legs are attached to ends of the at least one band and connected to one another by only the at least one band. Each strut attachment leg defines a single notch configured to receive one of the flanges on the strut. The screw housing receives the at least one band and captures the screw while allowing the screw to rotate. The screw housing positions the screw so that the threads on the screw engage the slots in the at least one band. The clamp is configured to secure the tube to the strut when the clamp is placed over the tube, the strut attachment legs are positioned relative to the strut so that the notches in the strut attachment legs receive at least one of the flanges on the strut, and the screw is rotated to draw the at least one band further into the screw housing and thereby tighten the clamp around the tube.

In one aspect, the at least one band includes first and second bands that each have a first end and a second end opposite of the first end. The slots extend across the width of the first band and are disposed adjacent to the second end of the first band. Each strut attachment leg is fixed to the first end of one of the bands. The screw housing receives the second ends of the bands.

In one aspect, the second band defines a groove adjacent to the second end thereof. The groove receives a portion of the screw and conforms to a shape thereof so that engagement between the screw and the groove retains the second end of the second band within the screw housing.

In one aspect, the at least one band is made from a first material and the strut attachment legs are made from a second material that is different from the first material.

In one aspect, each strut attachment leg forms a loop configured to receive one of the ends of the at least one band.

In one aspect, the notch in one of the strut attachment legs receives one of the flanges on the strut, and the notch in the other one of the strut attachment legs receives the other one of the flanges on the strut.

In one aspect, the notch in the one of the strut attachment legs receives one of the flanges on the strut, and the notch in the other one of the strut attachment legs receives the same flange on the strut.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A strut clamp according to the present disclosure has a one-piece design that easily attaches conduit, pipe, tube, hose, or any cylindrical object of virtually any outside diameter directly to any industry-standard strut profile. The one-piece design includes multiple pieces that are connected together to form a single piece. The clamp acts as a third hand for a tradesmen by temporarily securing the conduit, pipe, or tube to be clamped while the tradesman aligns the conduit, pipe, or tube with other conduits, pipes, or tubes connected thereto. The clamp makes it possible to secure four multiple diameters types of conduit, pipe, or tube, or hose using a single clamp type. The four diameter types include iron pipe size, intermediate metallic conduit, electrical metal tubing, and exact outer diameter tubing. The ability of the clamp to fit multiple sizes of conduits, pipes, and tubes significantly reduces the number of parts required on any project.

The one-piece design of the clamp is enabled by a worm gear fastener that ensures the proper torque-tension relationship for reducing or allowing lateral pipe movement (e.g., movement of a pipe along a length of a strut to which the pipe is secured). The worm gear is designed to resist loosening in high vibration applications. In addition, the design of the clamp reduces the number of parts required relative to the multi-piece clamp without the need to brake clamp halves apart from one another, which reduces labor costs and avoids a break point that may have sharp edges. The design of the clamp reduces labor cost associated with installation by about sixty percent.

In addition, the clamp makes it easy to relocate the conduit, pipe, or tube assembly before the final alignment thereof. Further, the clamp has a tidy appearance after the conduit, pipe, or tube assembly is complete. Moreover, the clamp is adapted for use on all cushioned clamping products, and provides a superior cost advantage over standard four-piece clamps. The cost advantage may be due to a material cost savings since four-piece clamps are typically made of steel with a zinc plated finish or hot dipped galvanized steep, while the clamp according to the present disclosure may be made from only stainless steel. However, even if the four-piece clamps are also made from only stainless steel, the clamp according to the present disclosure may still provide a cost advantage because making it requires less material and less labor.

Figure 12:
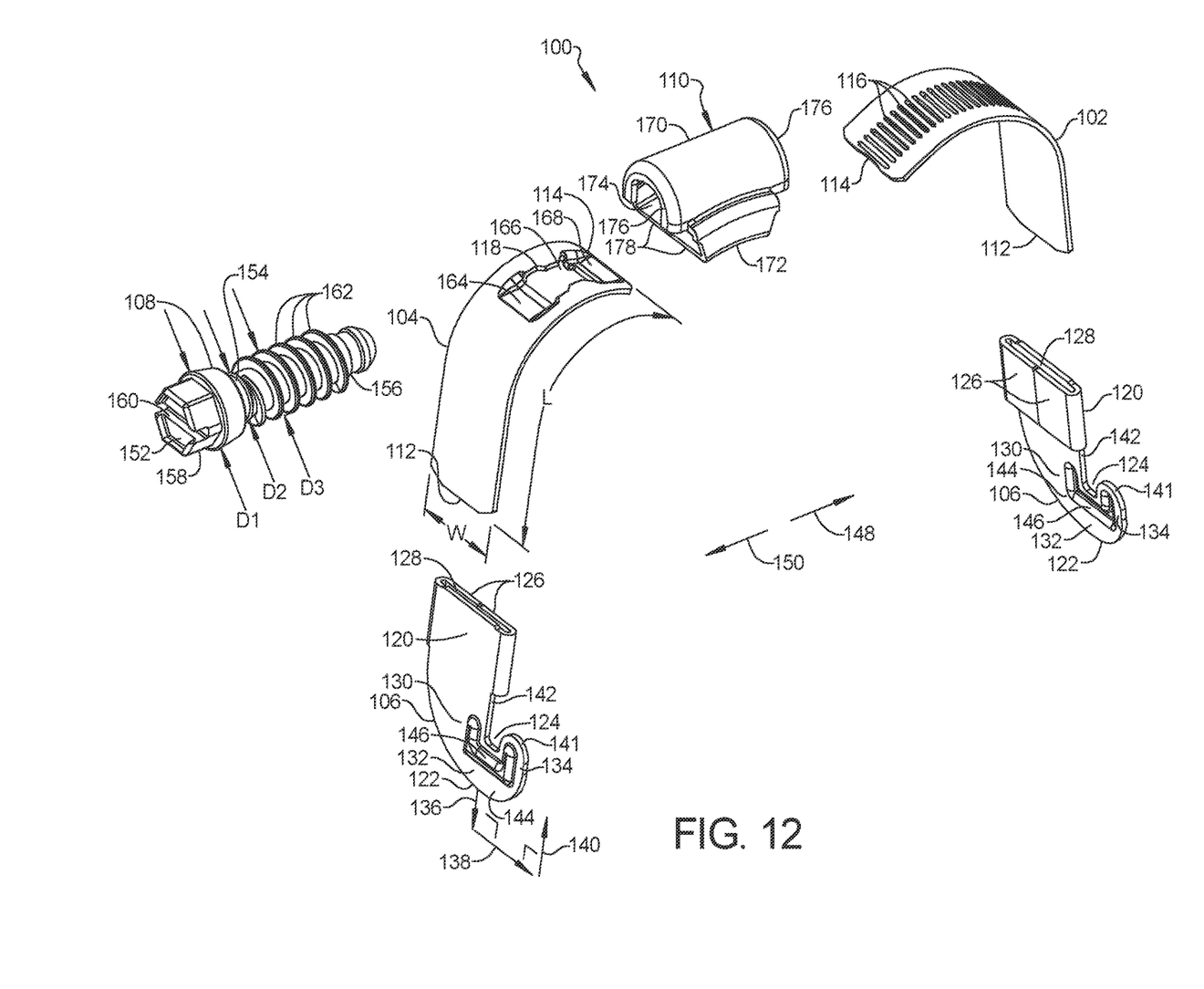
FIG. 12 is an exploded perspective view of the worm gear strut clamp.

Referring now to FIGS. 8 through 12, a clamp 100 includes a first band 102, a second band 104, a pair of strut attachment legs 106, a screw 108, and a screw housing 110 that contains the screw 108. As shown in FIG. 12, each of the first and second bands 102 and 104 has a first end 112, a second end 114 opposite of the first end 112, a width W, and a length L. The length L of each band 102, 104 extends from the first end 112 thereof to the second end 114 thereof.

The length L of the second band 104 may be approximately equal to the length L of the first band 102 (e.g., within a manufacturing tolerance of the length L of the first band 102) such that the screw housing 110 is positioned approximately equidistant from the strut attachment legs 106. In turn, the screw 108 is easily accessible. Each strut attachment leg 106 is fixed to the first end 112 of one of the bands 102, 104, and the screw housing 110 receives the second ends 114 of the bands 102, 104. In addition, the screw housing 110 captures the screw 108 while allowing the screw 108 to rotate.

The first band 102 defines a plurality of slots 116 adjacent to the second end 114 thereof. The slots 116 extends across a portion of the width W of the first band 102 and are disposed at various locations along the length of the first band 102. The slots 116 may be disposed in only a segment of the length of the first band 102 that extends from the second end 114 thereof to a midpoint of the first band 102 between the first and second ends 112 and 114 thereof.

The second band 104 defines a groove 118 adjacent to the second end 114 thereof. The groove 118 receives a portion of the screw 108 and conforms to the shape of that portion of the screw 108. As a result, engagement between the screw 108 and the groove 118 retains the second end 114 of the second band 104 within the screw housing 110. Instead of or in addition to defining the groove 118, the second band 104 may define a plurality of slots (not shown) adjacent to the second end 114 thereof. The slots in the second band 104 may be similar or identical to the slots 116 in the first band 102. The slots in the second band 104 may be disposed in only a segment of the length of the second band 104 that extends from the second end 114 thereof to a midpoint of the second band 104 between the first and second ends 112 and 114 thereof.

Each strut attachment leg 106 includes a rectangular main body 120, a hooked end 122 defining a notch 124, and a pair of tabs 126 that are folded over to form a loop 128. The loop 128 on each strut attachment leg 106 receives the first end 112 of one of the bands 102, 104. Each strut attachment leg 106 may be fixed to the first end 112 of one of the bands 102, 104 by crimping the loop 128 onto the first end 112. Additionally or alternatively, the loop 128 may be welded and/or fastened to the first end 112. The strut attachment legs 106 are connected to one another by only the bands 102, 104.

The hooked end 122 has a J-shaped profile. The hooked end 122 includes a first portion 130, a second portion 132, and a third portion 134. The first portion 130 of the hooked end 122 extends in a first direction 136. The second portion 132 of the hooked end 122 extends in a second direction 138 perpendicular to the first direction 136. The third portion 134 of the hooked end 122 extends in a third direction 140 perpendicular to the second direction 138 and parallel to the first direction 136, and has a rounded free end 141. The first, second, and third portions 130, 132, and 134 of the hooked end 122 have side edges 142 that collectively define the notch 124.

In the example shown, the hooked end 122 of each strut attachment leg 106 includes a flat portion 144 that is coplanar with the main body 120 of that strut attachment leg 106 and a rib 146 that protrudes from the flat portion 144. The ribs 146 increase the strength and rigidity of the hooked ends 122. Each rib 146 is disposed in the first, second, and third portions 130, 132, and 134 of the respective hooked end 122. Each rib 146 protrudes from the flat portion 144 of the hooked end 122 of one of the strut attachment legs 106 in a direction that is opposite from a direction in which the tabs 126 project from the main body 120 of the same strut attachment leg 106.

The strut attachment legs 106 mirror one another. For example, on the strut attachment leg 106 shown on the left in FIG. 12, the tabs 126 project from main body 120 in a fourth direction 148, and the rib 146 protrudes from the flat portion 144 in a fifth direction 150 that is opposite of the fourth direction 148. In contrast, on the strut attachment leg 106 shown on the right in FIG. 12, the tabs 126 project from main body 120 in the fifth direction 150, and the rib 146 protrudes from the flat portion 144 in the fourth direction 148.

The strut attachment legs 106 may be stiffer than the bands 102, 104 due to, for example, the strut attachment legs 106 being made from a different material, having a different geometry, and/or having a different thickness than the bands 102, 104. The bands 102, 104 are made from a first material (e.g., steel, iron, or a combination thereof), and the strut attachment legs 106 are made from a second material (e.g., steel, iron, or a combination thereof). The second material may be stiffer and/or thicker than the first material.

The screw 108 includes a head 152, a neck 154, and a shank 156. The head 152 of the screw 108 has a hexagonal perimeter 158 and a slot 160 extending into an end of the head 152. The shank 156 of the screw 108 includes a plurality of threads 162. The head 152 has an outer diameter D1, the neck 154 has an outer diameter D2, and the shank 156 has an outer diameter D3. The outer diameter D2 of the neck 154 is less than the outer diameter D1 of the head 152 and less than the outer diameter D3 of the shank 156. The screw 108 may be formed from steel, iron, or a combination thereof.

The groove 118 in the second band 104 includes a first portion 164, a second portion 166, and a third portion 168. The first portion 164 of the groove 118 conforms to the shape of the head 152 of the screw 108. For example, the width of the first portion 164 may be approximately equal to the outer diameter D1 of the head 152. The second portion 166 of the groove 118 conforms to the shape of the neck 154 of the screw 108. For example, the width of the second portion 166 may be approximately equal to the outer diameter D2 of the neck 154. The third portion 168 of the groove 118 conforms to the shape of the shank 156 of the screw 108. For example, the width of the third portion 166 may be approximately equal to the outer diameter D3 of the shank 156.

The screw housing 110 includes a screw portion 170 and a band portion 172 that cooperate with one another to define a single cavity 174. The screw portion 170 of the screw housing 110 has a half cylinder shape, and the band portion 172 of the screw housing 110 has a truncated pyramid shape. Portions of the bands 102, 104 and the screw 108 are disposed in the cavity 174 of the screw housing 110. The neck 154 of the screw 108 and the shank 156 of the screw 108 are disposed in the portion of the cavity 174 defined by the screw portion 170 of the screw housing 110. The second ends 114 of the bands 102, 104 are disposed in the portion of the cavity 174 defined by the band portion 172 of the screw housing 110.

The screw portion 170 of the screw housing 110 includes a pair of flanges 176 that retain the screw 108 within the screw housing 110. The band portion 172 of the screw housing 110 includes a pair of tabs 178 that are folded toward the screw portion 170 of the screw housing 110 to enclose the cavity 174 of the screw housing 110. The screw housing 110 may be formed from steel, iron, or a combination thereof.

To assemble the clamp 100, the first end 112 of each band 102, 104 is inserted into the loop 128 of one of the strut attachment legs 106 and is attached to that strut attachment leg 106 by, for example, crimping the tabs 126 onto the first end 112. Then, the screw 108 is positioned in the groove 118 in the second band 104 so that the head 152, neck 154, and shank 156 are respectively disposed in the first, second, and third portions 164, 166, and 168 of the groove 118. Then, with the tabs 178 folded outward as represented by the phantom lines in FIG. 11, the second end 114 of the second band 104 and the neck 154 and shank 156 of the screw 108 are inserted into the cavity 174 of the screw housing 110. The tabs 178 are then folded toward the screw portion 170 of the screw housing 110 to capture the second end 114 of the second band 104 and the screw 108 in the screw housing 110 as shown.

Once the second band 104 and the screw 108 are captured in the screw housing 110, the second end 114 of the first band 102 is inserted into the cavity 174 between the second end 114 of the second band 104 and the shank 156 of the screw 108. In turn, the screw housing 110 positions the screw 108 so that the threads 162 on the screw 108 engage the slots 116 in the first band 102. At this point, the clamp 100 is fully assembled as shown in FIGS. 8 through 11. The screw 108 may be rotated clockwise so that the screw 108 progressively engages more of the slots 116 in the first band 102 and thereby draws the second end 114 of the first band 102 further into the cavity 174.

Figure 13:
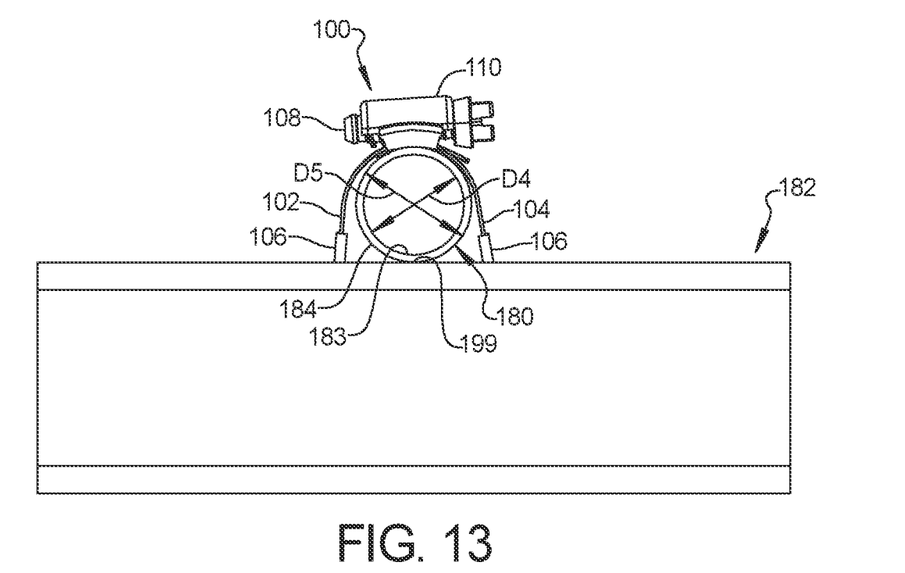
FIG. 13 is an end view of the worm gear strut clamp securing a conduit, tube, or pipe to a strut.
Figure 14:
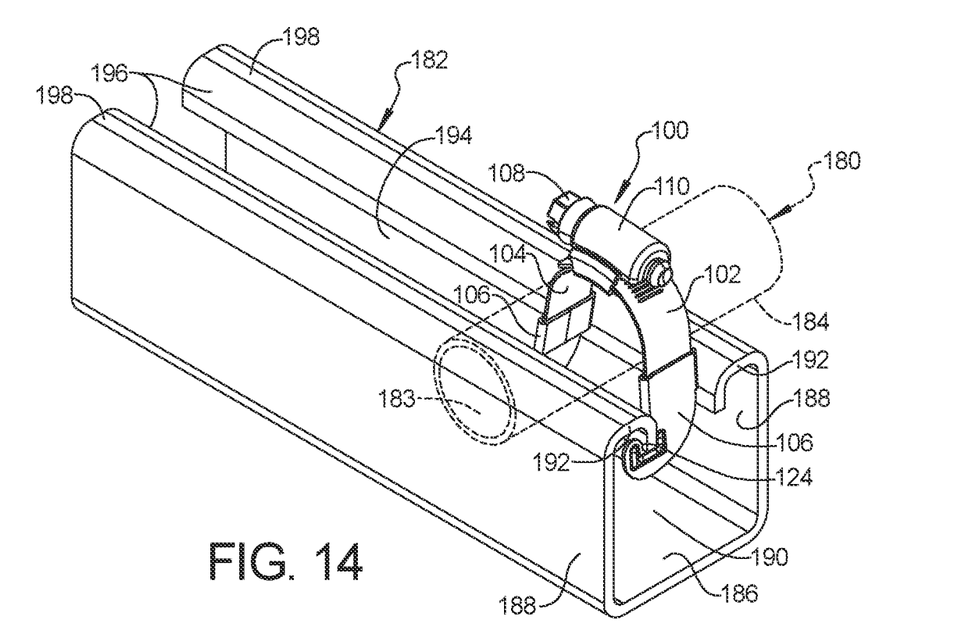
FIG. 14 is a perspective view of the worm gear strut clamp securing a conduit, tube, or pipe to a strut.

Referring now to FIGS. 13 and 14, a method of using the clamp 100 to secure a conduit, pipe, or tube 180 to a strut 182 will now be described. The tube 180 has an inner surface 183, an outer surface 184, an inner diameter D4, and an outer diameter D5. The strut 182 the strut includes a bottom wall 186 and a pair of sidewalls 188 projecting from the bottom wall 186 to define a rectangular channel 190 therebetween. The sidewalls 188 form flanges 192 that are turned inward toward the bottom wall 186 to define a slot or opening 194 therebetween. The opening 194 between the flanges 192 provides access to the rectangular channel 190.

Once the tube 180 is positioned on the flanges 192 of the strut 182 as shown, the clamp 100 is placed around the tube 180 and the strut attachment legs 106 of the clamp 100 are inserted one at a time through the opening 194 between flanges 192. After the strut attachment legs 106 are inserted at least partially through the opening 194, the strut attachment legs 106 are positioned so that the notches 124 in the strut attachment legs 106 receive one of the flanges 192 on the strut 182 as shown. When the notches 124 in the strut attachment legs 106 receive one of the flanges 192 on the strut 182, the third portion 134 of each hooked end 122 is disposed between that flange 192 and the sidewall 188 of the strut 182 forming that flange 192. The clamp 100 may then be slid along an internal face 196 of that flange 192 as required to properly orient the tube 180 to ensure a straight run (e.g., to ensure that the tube 180 and other tubes joined thereto are aligned in a straight line).

Once the clamp 100 is positioned along the flange 192 to provide the desired alignment, the screw 108 is rotated clockwise to draw the second end 114 of the first band 102 further into the cavity 174 of the screw housing 110. In turn, the clamp 100 tightens around the outer surface 184 of the tube 180 until a radius R of the clamp 100 is approximately equal to, or slightly greater than, the outer diameter D5 of the tube 180. At that point, the clamp 100 secures the tube 180 to the strut 182. When the clamp 100 secures the tube 180 to the strut 182, the screw 108 and the screw housing 110 are diametrically opposed from a contact interface 199 between the tube 180 and the strut 182. If further alignment of the tube 180 and other tubes joined thereto is desired, the screw 108 may be turned counterclockwise to loosen the clamp 100, and then turned clockwise again to tighten the clamp 100 once the proper alignment is achieved.

To remove the clamp 100 from the tube 180 and the strut 182, the screw 108 is rotated counterclockwise to move the second end 114 of the first band 102 out of the cavity 174 of the screw housing 110 and thereby loosen the clamp 100 from the tube 180. Once the clamp 100 is sufficiently loosened from the tube 180, the strut attachment legs 160 of the clamp 100 are disengaged from the flange 192 of the strut 182, and the strut attachment legs 160 are removed from the rectangular channel 190 one at a time. The clamp 100 is then removed from the tube 180 and the strut 182, and the clamp 100 may be reused at another location to secure the tube 180 to the strut 182.

Figure 15:
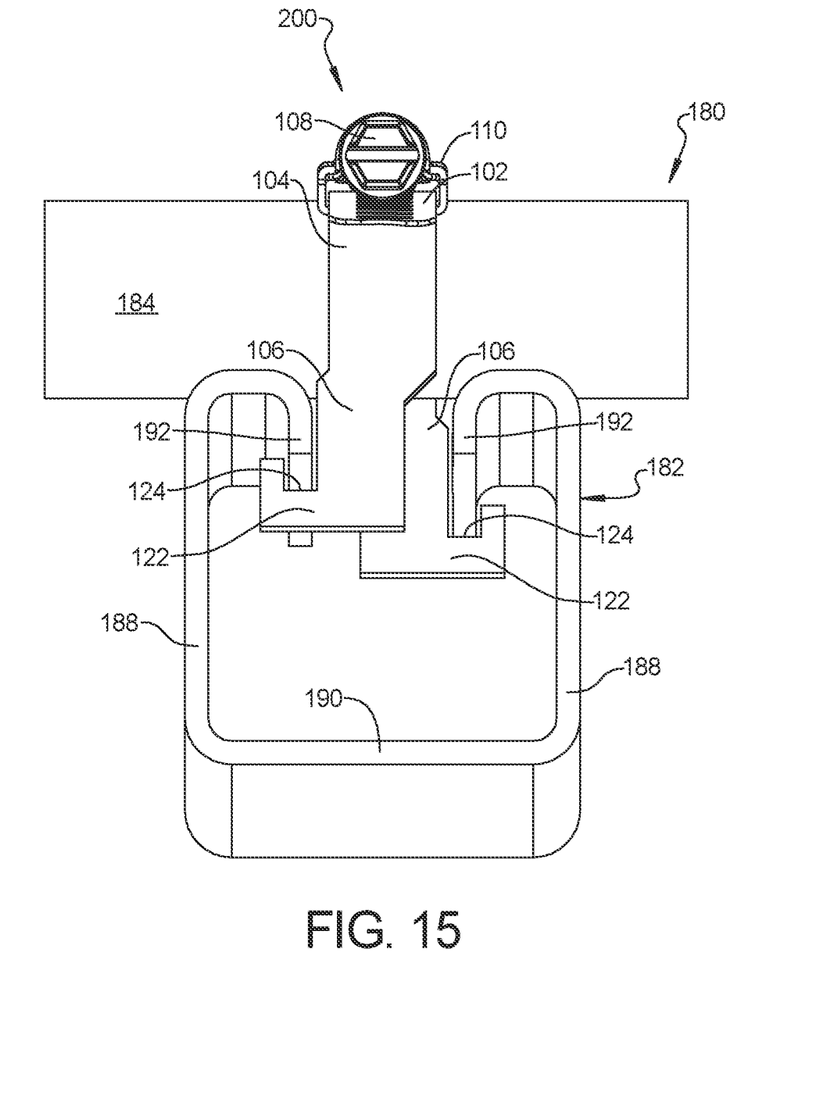
FIG. 15 is a perspective view of another worm gear strut clamp according to the present disclosure securing a conduit, tube, or pipe to a strut.

With additional reference to FIG. 15, a clamp 200 is shown that is similar to the clamp 100 except for the orientation of the strut attachment legs 106. The strut attachment legs 106 of the clamp 100 are oriented in the same direction, and therefore the notches 124 in the strut attachment legs 106 receive only one of the flanges 192 on the strut 182. In contrast, the strut attachment legs 106 of the clamp 200 are oriented in opposite directions. Therefore, with the clamp 200, the notch 124 in one of the strut attachment legs 106 receives one of the flanges 192 on the strut 182 while the notch 124 in the other strut attachment leg 106 receives the other flange 192 on the strut 182.

There are also other differences between the clamp 100, 200. For example, while the hooked ends 122 on the strut attachment legs 106 of the clamp 100 are rounded, the hooked ends 122 on the strut attachment legs 106 of the clamp 200 are squared. In addition, the ribs 146 are omitted from the hooked ends 122 on the strut attachment legs 106 of the clamp 200. Further, each strut attachment leg 106 of the clamp 200 is formed (e.g., stamped) together with one of the bands 102, 104 as a unitary structure. However, the clamp 200 may not differ from the clamp 100 in any of these other ways.

In various implementations, the second band 104 may be formed (e.g., stamped) together with one of the strut attachment legs 106 as a unitary structure, and the first band 102 may be formed separate from the other strut attachment leg 106. In these implementations, the first band 102 may be made from the first material, while the second band 104 and the strut attachment legs 106 may be made from the second material which, as noted above, may be stiffer and/or thicker than the first material. In addition, the second band 104 may be considered part of the strut attachment leg 106 that the second band 104 is formed together with as opposed to another band. Thus, the clamps 100, 200 may include only one band (i.e., the first band 102).

In the examples discussed above, each strut attachment leg 106 includes a single hooked end 122, and the notch 124 in each hooked end 122 receives one of the flanges 192 on the strut 182. In various implementations, each strut attachment leg 106 may include a pair of hooked ends 122 that are oriented in opposite directions. The notch 124 in one of the hooked ends 122 of each strut attachment leg 106 receives one of the flanges 192 on the strut 182 while the notch 124 in the other hooked end 122 of the respective strut attachment leg 106 receives the other flange 192 on the strut 182. Thus, each strut attachment leg 106 receives both of the flanges 192 on the strut 182.

There are generally three standard sizes of conduits, pipes, or tubes: rigid steel pipe size (or iron pipe size), intermediate metallic conduit, and electric metallic tubing. In addition, there are exact outer diameter sizes for tubing. The sizes of the clamps 100, 200 can be adjusted to fit conduits, pipes, or tubes having standards sizes or sizes between standard sizes. In addition, the sizes of the clamps 100, 200 can be adjusted to fit metric-sized polypropylene random copolymer (PPR) pipes or standard-sized polyvinyl chloride (PVC) pipes. Further, the sizes of the clamps 100, 200 can be adjusted to fit an assembly of conduits, pipes, or tubes having multiple outer diameters. Due to their designs, the clamps 100, 200 can be adjusted to fit a virtually limitless size range of conduits, pipes, tube, or any other items that have a cylindrical body.

Figure 16:
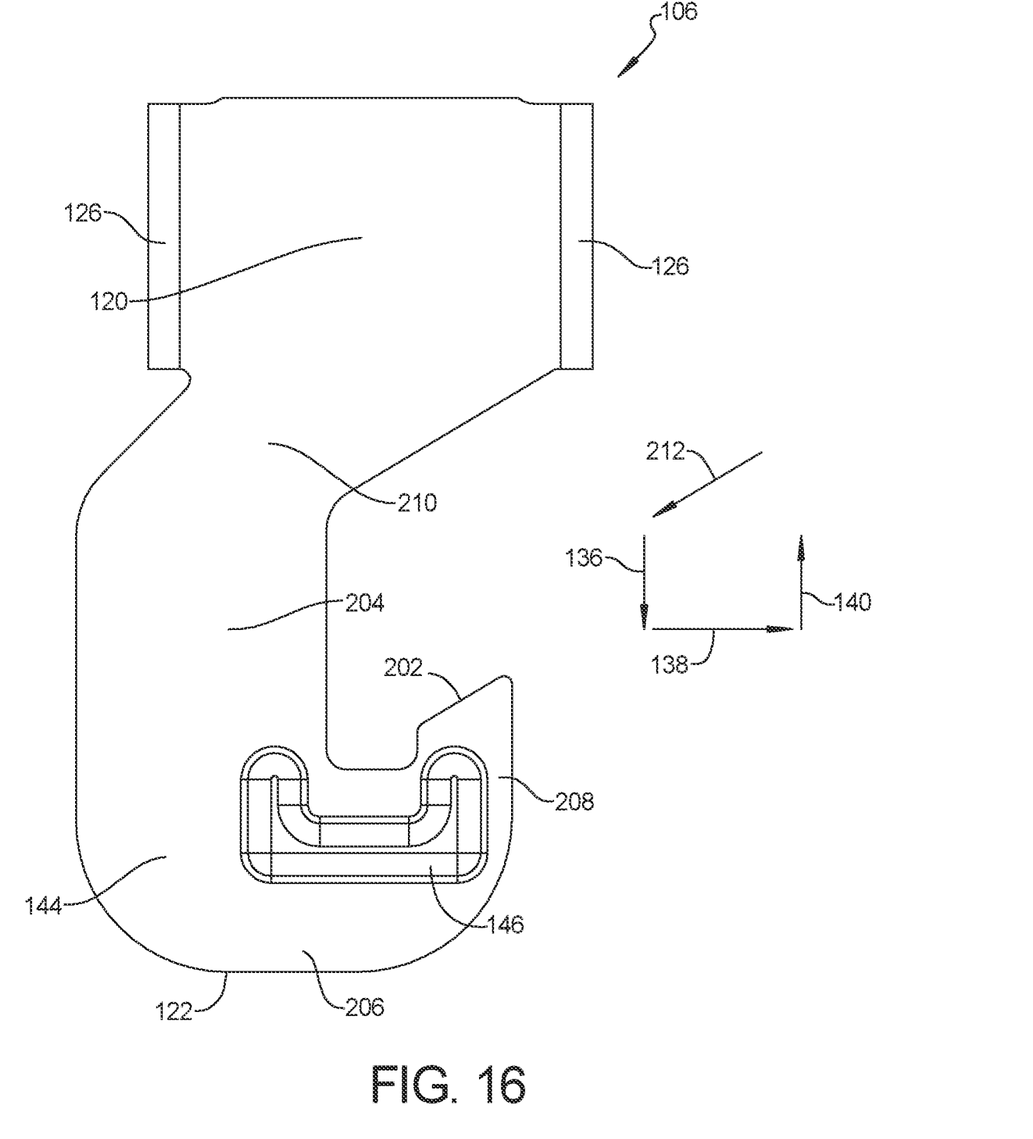
FIG. 16 is a side view of a strut attachment leg according to the present disclosure.

Referring now to FIG. 16, an alternative embodiment of the strut attachment leg 106 is shown. The strut attachment leg 106 shown in FIG. 16 is similar to each strut attachment leg 106 included in the clamp 100 except for the shape of its outer perimeter and the shape of its free end. For example, while each strut attachment leg 106 in the clamp 100 has the rounded free end 141, the strut attachment leg 106 shown in FIG. 16 has a chamfered free end 202.

In another example, as discussed above with reference to FIG. 12, each strut attachment leg 106 in the clamp 100 includes the first portion 130 that extends in the first direction 136, the second portion 132 that extends in the second direction 138, and the third portion 134 that extends in the third direction 140. Similarly, the strut attachment leg 106 shown in FIG. 16 includes a first portion 204 that extends in the first direction 136, a second portion 206 that extends in the second direction 138, and a third portion 208 that extends in the third direction 140. However, the outer perimeters of the first, second, and third portions 204, 206, and 208 of the strut attachment leg 106 shown in FIG. 16 are shaped differently than the outer perimeters of the first, second, and third portions 130, 132, and 134 of the strut attachment leg 106 in the clamp 100. In addition, the strut attachment leg 106 shown in FIG. 16 includes a fourth portion 210 that connects the first portion 204 to the rectangular main body 120 of the strut attachment leg 106. The fourth portion 210 of the strut attachment leg 106 extends in a fourth direction 212 having one component that is the same as the first direction 136 and another component that is opposite of the second direction 138.

The strut attachment leg 106 shown in FIG. 16 may be used with the clamp 100 in place of each strut attachment leg 106 shown in FIGS. 8 through 14. In addition, the strut attachment leg 106 shown in FIG. 16 may be used with the clamp 200 in place of each strut attachment leg 106 shown in FIG. 15. As with each strut attachment leg 106 of the clamp 100, the strut attachment leg 106 shown in FIG. 16 may be fixed to the first end 112 of one of the bands 102, 104 by crimping, welding, and/or fastening the loop 128 onto the first end 112. Alternatively, as with the strut attachment leg 106 of the clamp 200, the strut attachment leg 106 shown in FIG. 16 may be formed (e.g., stamped) with one of the bands 102, 104 as a unitary structure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A clamp for securing a tube to a strut, the strut including a bottom wall and a pair of sidewalls projecting from the bottom wall to define a rectangular channel therebetween, the sidewalls forming flanges that are turned inward to define an opening therebetween that provides access to the rectangular channel, the clamp comprising:

first and second bands that each has a first end and a second end opposite of the first end, the first band defining slots therein extending across a width thereof and disposed adjacent to the second end thereof;

a pair of strut attachment legs with each strut attachment leg being fixed to the first end of one of the bands and each strut attachment leg defining only one notch configured to receive one of the flanges on the strut, each strut attachment leg forming a loop, the loop formed by one of the strut attachment legs receiving the first end of the first band and wrapping completely therearound, the loop formed by the other one of the strut attachment legs receiving the first end of the second band and wrapping completely therearound;

a screw having threads; and a screw housing receiving the second ends of the bands and capturing the screw while allowing the screw to rotate, the screw housing positioning the screw so that the threads on the screw engage the slots in the first band, wherein the clamp is configured to secure the tube to the strut when the clamp is placed over the tube, the strut attachment legs are positioned relative to the strut so that the notches in the strut attachment legs receive at least one of the flanges on the strut, and the screw is rotated to draw the first band further into the screw housing and thereby tighten the clamp around the tube.

2. The clamp of claim 1 wherein each strut attachment leg has a hooked end that defines the notch.

3. The clamp of claim 2 wherein the hooked end of each strut attachment leg includes a first portion that extends in a first direction, a second portion that extends in a second direction perpendicular to the first direction, and a third portion that extends in a third direction perpendicular to the second direction and parallel to the first direction, the first, second, and third portions having side edges that define the notch.

4. The clamp of claim 3 wherein the third portion of each hooked end is configured to be disposed between one of the flanges on the strut and the respective sidewall of the strut when the notch in the respective hooked end receives the respective flange.

5. The clamp of claim 2 wherein the hooked end of each strut attachment leg has a J-shaped profile.

6. The clamp of claim 2 wherein the notch in the hooked end of one of the strut attachment legs receives one of the flanges on the strut, and the notch in the hooked end of the other one of the strut attachment legs receives the other one of the flanges on the strut.

7. The clamp of claim 2 wherein the notch in the hooked end of one of the strut attachment legs receives one of the flanges on the strut, and the notch in the hooked end of the other one of the strut attachment legs receives the same flange on the strut.

8. A clamp for securing a tube to a strut, the strut including a bottom wall and a pair of sidewalls projecting from the bottom wall to define a rectangular channel therebetween, the sidewalls forming flanges that are turned inward to define an opening therebetween that provides access to the rectangular channel, the clamp comprising:

at least one band defining slots extending across a width thereof and disposed at various locations along a length thereof;

a pair of strut attachment legs with each strut attachment leg being fixed to an end of the at least one band and each strut attachment leg defining only one notch configured to receive one of the flanges on the strut, each strut attachment leg forming a loop that receives one of the ends of the at least one band and wraps completely around the one end of the at least one band;

a screw having threads; and a screw housing coupled to the at least one band and positioned approximately equidistant from the strut attachment legs, the screw housing capturing the screw while allowing the screw to rotate, the screw housing positioning the screw so that the threads on the screw engage the slots in the at least one band, wherein the clamp is configured to secure the tube to the strut when the clamp is placed over the tube, the strut attachment legs are positioned relative to the strut so that the notches in the strut attachment legs receive at least one of the flanges on the strut, and the screw is rotated to draw the at least one band into the screw housing and thereby tighten the clamp around the tube.

9. The clamp of claim 8 wherein the at least one band includes first and second bands that each has a first end and a second end opposite of the first end, the slots extending across the width of the first band and disposed adjacent to the second end of the first band, each strut attachment leg being fixed to the first end of one of the bands, the screw housing receiving and retaining the second ends of the bands.

10. The clamp of claim 9 wherein the first band has a first length and the second band has a second length that is approximately equal to the first length.

11. The clamp of claim 8 wherein when the clamp secures the tube to the strut, the screw and the screw housing are diametrically opposed from a contact interface between the tube and the strut.

12. The clamp of claim 8 wherein the notch in one of the strut attachment legs receives one of the flanges on the strut, and the notch in the other one of the strut attachment legs receives the other one of the flanges on the strut.

13. The clamp of claim 8 wherein the notch in the one of the strut attachment legs receives one of the flanges on the strut, and the notch in the other one of the strut attachment legs receives the same flange on the strut.

14. A clamp for securing a tube to a strut, the strut including a bottom wall and a pair of sidewalls projecting from the bottom wall to define a rectangular channel therebetween, the sidewalls forming flanges that are turned inward to define an opening therebetween that provides access to the rectangular channel, the clamp comprising:

at least one band defining slots extending across a width thereof and disposed at various locations along a length thereof;

a pair of strut attachment legs attached to ends of the at least one band and connected to one another by only the at least one band, each strut attachment leg defining only one notch configured to receive one of the flanges on the strut, each strut attachment leg forming a loop that receives one of the ends of the at least one band and wraps completely around the one end of the at least one band;

a screw having threads; and a screw housing receiving the at least one band and capturing the screw while allowing the screw to rotate, the screw housing positioning the screw so that the threads on the screw engage the slots in the at least one band, wherein the clamp is configured to secure the tube to the strut when the clamp is placed over the tube, the strut attachment legs are positioned relative to the strut so that the notches in the strut attachment legs receive at least one of the flanges on the strut, and the screw is rotated to draw the at least one band further into the screw housing and thereby tighten the clamp around the tube.

15. The clamp of claim 14 wherein the at least one band includes first and second bands that each has a first end and a second end opposite of the first end, the slots extending across the width of the first band and disposed adjacent to the second end of the first band, each strut attachment leg being fixed to the first end of one of the bands, the screw housing receiving the second ends of the bands.

16. The clamp of claim 15 wherein the second band defines a groove adjacent to the second end thereof, the groove receiving a portion of the screw and conforming to a shape thereof so that engagement between the screw and the groove retains the second end of the second band within the screw housing.

17. The clamp of claim 14 wherein the at least one band is made from a first material and the strut attachment legs are made from a second material that is different from the first material.

18. The clamp of claim 14 wherein the notch in one of the strut attachment legs receives one of the flanges on the strut, and the notch in the other one of the strut attachment legs receives the other one of the flanges on the strut.

19. The clamp of claim 14 wherein the notch in the one of the strut attachment legs receives one of the flanges on the strut, and the notch in the other one of the strut attachment legs receives the same flange on the strut.

\* \* \* \* \*